United States Patent [19]

Tamarin et al.

[11] Patent Number: 4,787,264
[45] Date of Patent: Nov. 29, 1988

[54] REMOTE CONTROL WITH BALL BEARINGS IN LINKED BALL-CAGE ELEMENTS

[75] Inventors: Charles S. Tamarin, New Rochelle, N.Y.; Gerard Magliaro, Brookfield Center, Conn.

[73] Assignee: Incom International Inc., Pittsburgh, Pa.

[21] Appl. No.: 933,529

[22] Filed: Nov. 21, 1986

[51] Int. Cl.$^4$ .............................................. F16C 1/10
[52] U.S. Cl. ................................................ 74/502.3
[58] Field of Search ............ 74/501 R, 501 E, 501 C, 74/502, 505, 506; 464/174, 178; 384/49; 138/129, 120

[56] References Cited

U.S. PATENT DOCUMENTS

| | | | |
|---|---|---|---|
| 1,314,601 | 9/1919 | McCaskey | 464/174 |
| 1,602,691 | 10/1926 | McCaskey | 464/174 X |
| 1,930,272 | 10/1933 | Huck | 464/174 X |
| 2,372,204 | 3/1945 | Herkert | 74/501 C |
| 2,417,559 | 3/1947 | Larson | |
| 2,457,910 | 1/1949 | McLaren et al. | 74/502 X |
| 2,502,440 | 4/1950 | Deakin | 74/501 C X |
| 2,841,029 | 7/1958 | Richoux | 74/502 X |
| 3,258,990 | 7/1966 | Bratz | 74/501 C |
| 3,298,243 | 1/1967 | Geissler et al. | 74/501 C |
| 3,509,782 | 5/1970 | Molnar | 74/501 C |
| 3,552,218 | 1/1971 | Gregory, Jr. | 74/501 C |
| 3,667,313 | 6/1972 | Young, Jr. | 74/501 D |
| 3,841,171 | 10/1974 | Young, Jr. | 74/502 X |
| 4,062,251 | 12/1977 | Parsons | 74/501 C |
| 4,075,905 | 2/1978 | Schaaphok | 74/501 C |
| 4,297,913 | 11/1981 | Garbo | 74/501 C |
| 4,505,496 | 3/1985 | Fohl | 74/422 X |

FOREIGN PATENT DOCUMENTS 172609 8/1960 Sweden .................................. 384/49

Primary Examiner—Gary L. Smith
Assistant Examiner—Rodney M. Lindsey
Attorney, Agent, or Firm—Paul W. Garbo

[57] ABSTRACT

To replace conventional ball-cage strips for remote controls in which push-pull blades slide on ball bearings maintained properly spaced from one another by such strips, a linkable ball-cage element has been developed to form strips of such linked elements that overcome limitations of prior ball-cage strips. Each element has a head and neck at one end and a cavity and narrow entrance at the opposite end so that the head of one element can be inserted into the cavity of another element. Each element holding a ball is thus linked with other elements to provide a very flexible strip of any desired length.

12 Claims, 2 Drawing Sheets

REMOTE CONTROL WITH BALL BEARINGS IN LINKED BALL-CAGE ELEMENTS

BACKGROUND OF THE INVENTION

This invention relates to tubular remote controls in which one or more push-pull blades are slidable lengthwise in a tubular sheath on spaced ball bearings disposed on opposite sides of each blade. More particularly, the invention relates to a novel ball-cage strip for keeping the ball bearings properly spaced.

Illustrative of such a remote control is that disclosed in U.S. Pat. No. 2,841,029 to Richoux in which the balls are spaced from one another by metal cage strips having openings to hold the individual balls. As shown by Richoux, each opening in the cage strip is provided with transverse walls having a height at least equal to the rolling radius of the ball so that the ball is free to rotate within the opening without risk of the ball escaping the opening. The special structure of the metal cage strip is clearly illustrated by FIGS. 4,5 and 6 of the Richoux patent. It is evident in FIG. 4 of the Richoux patent that rubbing contact exists between the metal ball-cage strip and the metal push-pull flat core. Over prolonged use of the remote control, such metal-to-metal rubbing leads to abrasion and gouging of the metal elements and possible ultimate jamming of the control.

To avoid metal-to-metal rubbing, U.S. Pat. No. 3,667,313 to Young shows a ball-cage strip made of flexible plastic. While plastic ball-cage strips are successfully used in many controls, they cannot be used where the remote control is exposed to high temperatures, say above 400° F.

Accordingly, the object of this invention is to provide an improved ball-cage strip for tubular remote controls that overcomes the undesirable features of the metal and plastic ball-cage strips used heretofore.

SUMMARY OF THE INVENTION

In accordance with this invention, the ball-cage strip is formed by a series of linked elements, each of which has at least one perforation to retain a ball. Generally, each element will have a single opening for a single ball; in such case, the effective length of the element when linked is equal to the desired spacing of the balls in the remote control. Center-to-center spacing of balls is in the range of 0.500 to 0.875 inch in remote controls currently marketed. In some controls, the elements may have two or three spaced openings for balls and the effective length of these elements when linked will be, respectively, two or three times the desired centerto-center spacing of balls.

The linking of the elements has substantially the form of a ball-and-socket joint. More specifically, each element has a head attached by a neck to one end and a cavity with a narrow entrance at the opposite end to receive and capture the head of another element. The head and cavity of each ball-cage element are shaped and dimensioned to provide flexibility of the linked elements in the plane of the push-pull core or blade of the control, a feature substantially absent in metal ball-cage strips used heretofore. Of course, the loose fit of the head of each element in the cavity of an adjoining element provides flexibility of the linked elements to conform easily with all the bends of the push-pull blade.

The ball-cage elements of this invention may be made from a wide selection of materials including metals, plastics, ceramics and graphite. For high temperature service, a bearing type of alloy such as silicon bronze is preferred.

BRIEF DESCRIPTION OF THE DRAWINGS

For a fuller understanding of the invention, reference is now made to the accompanying drawings of which.

DESCRIPTION OF PREFERRED EMBODIMENT

Figure 2:
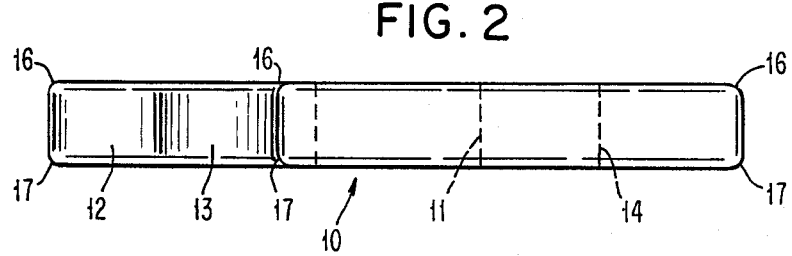
FIG. 2 is a lengthwise side view of the element of FIG. 1.

The linkable ball-cage element 10 has a circular opening 11 with a diameter slightly larger than that of the ball which is to be retained by element 10. Element 10 has a length at least double its width and its thickness is at least slightly greater than the radius of the ball used with element 10 but, of course, is less than the space maintained by the ball between the push-pull blade and a parallel ball guide of the remote control. Rounded head 12 with neck 13 projects from one longitudinal end of element 10 while the opposite end has rounded cavity 14 with a pair of lips 15 spaced from one another by a distance less than the diameter of head 12 but more than the width of neck 13. Preferably, all edges of element 10 are rounded as illustrated by top edge 16 and bottom edge 17 of element 10 in FIG. 2.

To link element 10 to another element 10, element 10 is held with its head 12 above cavity 14 of another element 10 and then both elements 10 are brought together in the same plane. Repeating this linking procedure produces the strip of linked ball-cage elements 10 shown on a reduced scale, in FIG. 3. Inasmuch as head 12 of element 10 at the left end of the linked strip shown in FIG. 3 serves no purpose it may be cut off as at dotted line 18, and cavity 14 of element 10 at the right end of the linked strip may be cut off as at dotted line 19. Elements 10 can be produced by various methods depending on the material selected. For many metals and plastics, stamping is usually the preferred economical method.

Figure 3:
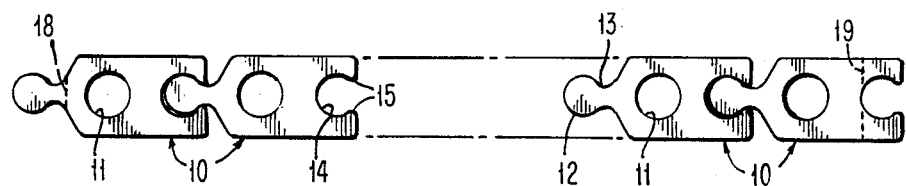
FIG. 3 is a top view of several of the elements of FIG. 1 linked together to form a ball-cage strip.
Figure 4:
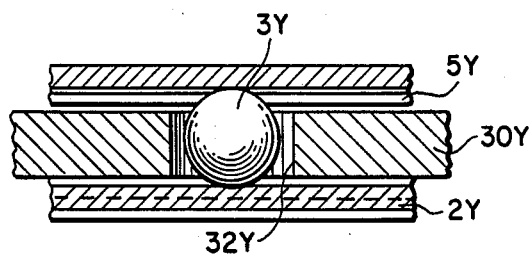
FIG. 4 is a partial cross-sectional view of the prior art remote control shown as FIG. 3 in U.S. Pat. No. 3,667,313 to Young.
Figure 5:
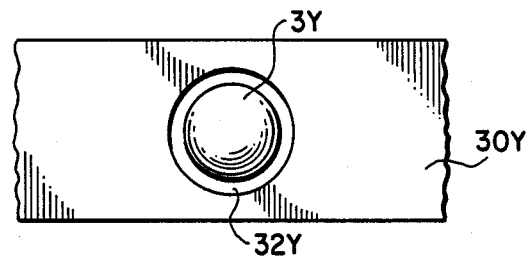
FIG. 5 is a top view of the ball-cage strip and ball shown as FIG. 4 in said patent of Young.
Figure 6:
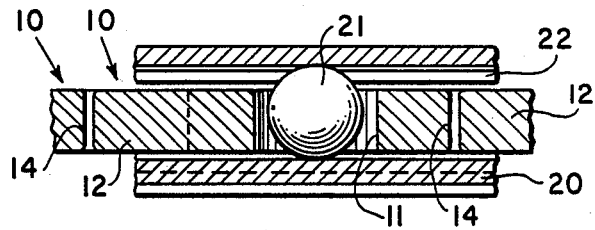
FIG. 6 is a partial cross-sectional view similar to FIG. 4 showing the remote control of this invention featuring the ball-cage strip of linked elements of FIG. 3.
Figure 7:
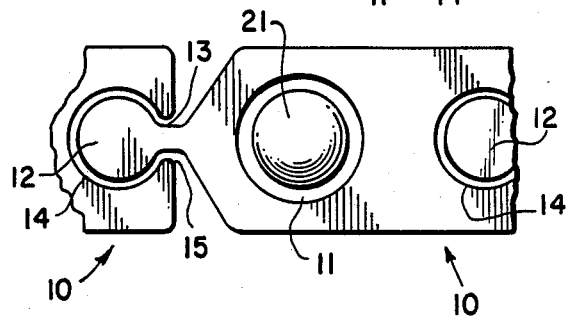
FIG. 7 is a top view of the ball-cage strip and ball of FIG. 6.

FIGS. 4 and 5 are copies of FIGS. 3 and 4, respectively, of U.S. Pat. No. 3,667,313 to Young (the letter Y has been added to the patent reference numerals to distinguish from the reference numerals used in describing this invention). FIGS. 4 and 5 illustrate the prior art remote control with Young's ball-cage strip 30Y made of flexible plastic which, as hereinbefore pointed out, cannot be used where the remote control is exposed to high temperatures, say above 400° F. FIGS. 6 and 7, similar to FIGS. 4 and 5, respectively, show the remote control with the novel ball-cage strip of linked elements 10 in lieu of Young's plastic strip 30Y. Specifically, in the remote control of FIGS. 6 and 7, push-pull blade 20, corresponding to blade 30Y of FIGS. 4 and 5, has a typicall ball 21, corresponding to ball 3Y, in each perforation 11 of linked elements 10 disposed between the upper face of blade 20 and ball guide 22,corresponding to ball guide 5Y of FIGS. 4 and 5. It is clear that each linkable element 10 with ball 21 in perforation 11 thereof has its head 12 and neck 13 captured in cavity 14 and the constricted entrance formed by lips 15 of a contiguous element 10 while its own cavity 14 captures head 12 of another contiguous element 10 in the series of linked elements 10 forming the ball-cage strip of this invention which has been more fully shown in FIG. 3.

Figure 8:
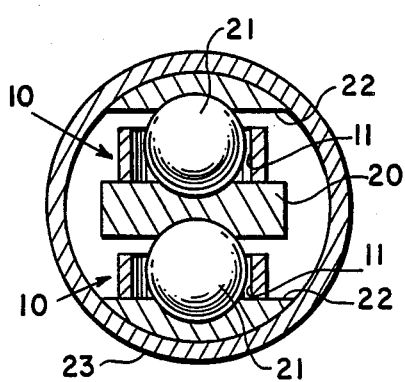
FIG. 8 is a transverse section of a remote control containing the ball-cage strips of this invention, taken through a perforation holding a ball in each of the ball-cage strips.

FIG. 8 is a tranverse section of a remote push-pull control equipped with the ball-cage strip of linked elements 10, shown in FIGS, 6 and 7 as well as FIG. 3, for each of the two rows of spaced balls 21 on opposite sides of push-pull balde 20. The two opposite ball guides 22 and the intervening elements of the remote control are, as customary, encased in flexible tubing 23.

As a specific example of the linkable ball-cage element of this invention, element 10 has an overall length of 0.625 inch, a width of 0.250 inch and a thickness of 0.075 inch. The effective length of element 10 when linked with other identical elements 10 is 0.500 inch which is the desired spacing of the balls held by linked elements 10. Circular perforation 11 has a diameter of 0.153 inch and receives a ball with a diameter of 0.1406 inch. Head 12 of element 10 has a diameter of 0.126 inch and neck 13 is 0.055 inch at its narrowest point. Cavity 14 has a diameter of 0.133 inch and the opening between lips 15 is 0.093 inch. The angle between the lengthwise side of element 10 and the side slanted toward neck 13 is 120°. Element 10 is made of silicon bronze because the remote control in which series of linked elements 10 are to be used will be exposed to temperature as high as 665° F. Even at such high temperatures, the series of linked elements 10 with the captive balls move freely with each stroke of the stainless steel push-pull blade because silicon bronze has low friction against stainless steel.

While the patents cited herein are illustrative of remote controls of the flexible type, i.e., controls having a flexible tubular sheath, the linked ball-cage elements of this invention can also be advantageously used in rigid remote controls, i.e., controls having a rigid tubular sheath which may have one or more bends.

Inherent advantages of the linked ball-cage elements of this invention include great flexibility and vibration-damping. Because the ball-cage elements are loosely linked to one another, the series of linked elements can easily bend and even permit some twisting without the danger of fatigue failure which can occur with conventional ball-cage strips. The same loose linkage of the novel ball-cage elements absorbs vibrations and thus minimizes potential damage of the remote control when used on a vibrating structure such as an aircraft engine.

Figure 1:
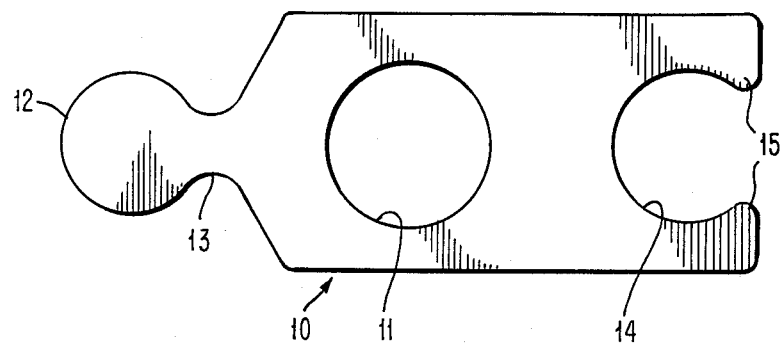
FIG. 1 is a top view of a preferred embodiment of the linkable ball-cage element of this invention.

Many variations and modifications of the invention will be apparent to those skilled in the art without departing from the spirit and scope of the invention. For instance, the slanted sides of element 10 which meet neck 13 may be at right angles to the longitudinal sides of element 10. The perforations for holding the balls may be square, rectangulur, elliptical or other shape. Elements 10 made of metals, ceramics or ceramets may be plated, e.g., with chromium or nickel to decrease the friction of elements 10 against the stainless steel push-pull blade and ball guides of the remote control. Head 12 and cavity 14 of each element 10 may have any of various shapes different from the nearly circular shape shown in FIG. 1. For example, head 12 and/or cavity 14 may be hexagonal. Also, to reduce the weight of element 10, the longitudinal sides may curve inwardly toward each other in the portion between perforation 11 and cavity 14. Elements 10 can reduce the ball-cage strips in remote controls having two or three push-pull blades as shown in U.S. Pat. No. 3.552,218 to Gregory, Jr. Accordingly, only such limitation should be imposed on the scope of the inventionn as are set forth in the appended claims.

What is claimed is:

1. In tubular remote controls wherein at least one flexible push-pull blade slides on rows of spaced balls positioned on the opposite faces of said blade the improvement of a ball-cage strip comprising a linked series of linkable ball-cage elements for spacing said balls in each of said rows, each said element having a flat, elongate body with a head and neck formed at one end and a cavity and entrance formed at the opposite end of said body, said head and said neck being shaped to fit loosely in said cavity and said entrance of another said element, said element having a thickness greater than the radius but less than the diameter of said balls and being provided with at least one perforation to retain one of said balls.

2. The linkable ball-cage elements of claim 1 in each of which the head and cavity have a basically circular contour and the neck and entrance have a width less than the diameter of said circular contour.

3. The linkable ball-cage elements of claim 1 which have been formed of a bearing-type metal and individually have a single cylindrical perforation.

4. The linkable ball-cage elements of claim 3 which when linked together provide a center-to-center spacing of the balls in the range of about 0.500 to 0.875 inch.

5. The linkable ball-cage elements of claim 4 in which the bearing-type metal is silicon bronze.

6. In a tubular remote control wherein a flexible push-pull blade is in contact with a row of spaced balls on each of its opposite faces, the improvement of a ball-cage strip for each said row of balls which is a series of linked ball-cage elements, each of said elements having a flat, elongate body with a head and neck formed at one end and a cavity and entrance formed at the opposite end of said body, said head and said neck being shaped to be captured in said cavity and said entrance of another said elements, each of said elements having a thickness greater than the radius but less than the diameter of said balls and having a perforation to retain one of said balls.

7. The improvement of claim 6 wherein the head and cavity of each of the ball-cage elements have a basically circular contour and the neck and entrance have a width less than the diameter of said circular contour.

8. The improvement of claim 6 wherein the perforation of each of the ball-cage elements is cylindrical.

9. The improvement of claim 8 wherein the center-to-center spacing of the balls in the linked ball-cage elements is in the range of about 0.500 to 0.875 inch.

10. The improvement of claim 8 wherein each of the ball-cage elements is made of a bearing-type metal.

11. The improvement of claim 6 wherein each of the ball-cage elements is made of silicon bronze.

12. The improvement of claim 11 wherein the center-to-center spacing of the balls in the linked ball-cage elements is in the range of about 0.500 to 0.875 inch.

* * * * *